United States Patent
Soomro

(10) Patent No.: US 9,439,105 B2
(45) Date of Patent: Sep. 6, 2016

(54) FRAME SYNCHRONIZATION WITH ACKNOWLEDGMENT TIMEOUT IN WIRELESS NETWORKS

(75) Inventor: Amjad Soomro, Hopewell Junction, NY (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1083 days.

(21) Appl. No.: 10/547,727

(22) PCT Filed: Mar. 2, 2004

(86) PCT No.: PCT/IB2004/000571
§ 371 (c)(1),
(2), (4) Date: Sep. 2, 2005

(87) PCT Pub. No.: WO2004/079983
PCT Pub. Date: Sep. 16, 2004

(65) Prior Publication Data
US 2006/0182071 A1    Aug. 17, 2006

Related U.S. Application Data

(60) Provisional application No. 60/451,990, filed on Mar. 5, 2003, provisional application No. 60/482,277, filed on Jun. 25, 2003.

(51) Int. Cl.
*G08C 17/00*    (2006.01)
*H04W 28/24*    (2009.01)
*H04L 1/18*    (2006.01)
(Continued)

(52) U.S. Cl.
CPC ............. *H04W 28/24* (2013.01); *H04L 1/188* (2013.01); *H04W 52/0248* (2013.01); *H04W 56/00* (2013.01)

(58) Field of Classification Search
CPC .............. H04W 52/0229; H04W 52/0216; H04W 52/0212; H04W 52/0225; H04W 56/00
USPC ............. 370/310, 311, 345, 347, 349, 350; 455/39, 500, 502, 507, 517, 524, 525
See application file for complete search history.

(56) References Cited

U.S. PATENT DOCUMENTS

| | | | |
|---|---|---|---|
| 5,231,634 A | * | 7/1993 | Giles et al. .................... 370/348 |
| 5,550,848 A | * | 8/1996 | Doshi et al. ................... 714/749 |
| 5,673,031 A | * | 9/1997 | Meier ............................ 340/2.4 |

(Continued)

FOREIGN PATENT DOCUMENTS

EP    0 682 425 A2    11/1995

*Primary Examiner* — Ricky Ngo
*Assistant Examiner* — Wei-Po Kao
(74) *Attorney, Agent, or Firm* — Larry Liberchuk

(57) ABSTRACT

A wireless local area network (WLAN) includes a first device and a second device. The first device sends a first frame including a first transmission indicator, which indicates that a service interval is to begin at a certain time. The second device sends an acknowledgement from the second device to the first device indicating receipt of the first transmission indicator. The first device sends a second frame including another first transmission indicator if, after a prescribed time period, the acknowledgement is not received by the first device. The first device also sends a last transmission indicator, which indicates that the service period will end at a certain time. The WLAN and its method of use provide synchronicity between the first and second devices as to the beginning and the end of a service period.

18 Claims, 3 Drawing Sheets

(51) Int. Cl.
*H04W 56/00* (2009.01)
*H04W 52/02* (2009.01)

(56) References Cited

U.S. PATENT DOCUMENTS

| | | | |
|---|---|---|---|
| 6,192,230 B1 * | 2/2001 | van Bokhorst et al. ... | 455/343.3 |
| 7,330,877 B2 * | 2/2008 | Kandala ........................ | 709/206 |
| 2002/0012337 A1 * | 1/2002 | Schmidl et al. ............... | 370/349 |
| 2002/0071449 A1 * | 6/2002 | Ho et al. ........................ | 370/447 |
| 2002/0089959 A1 * | 7/2002 | Fischer et al. ................ | 370/338 |
| 2002/0105940 A1 * | 8/2002 | Forssell ................ | H04L 1/1635 370/349 |
| 2003/0012165 A1 | 1/2003 | Soomro | |
| 2004/0131019 A1 * | 7/2004 | Kandala ........................ | 370/311 |

* cited by examiner

FRAME SYNCHRONIZATION WITH ACKNOWLEDGMENT TIMEOUT IN WIRELESS NETWORKS

CROSS REFERENCE TO RELATED APPLICATION

This application claims the benefit of U.S. provisional application Ser. No. 60/451,990 filed Mar. 5, 2003 and U.S. provisional application Ser. No. 60/482,277 filed Jun. 25, 2003 both of which are incorporated herein by reference.

The use of wireless connectivity in data and voice communications continues to increase. These devices include portable computers, computers in a wireless local area network (WLAN), portable handsets and the like. The wireless communication bandwidth has significantly increased with advances of channel modulation techniques, making the WLAN a viable alternative to wired and optical fiber solutions.

IEEE 802.11 is a standard that covers the specification for the Medium Access Control (MAC) sub-layer and the Physical (PHY) layer of the WLAN. While this standard has provided for significant improvement in the control of voice and data traffic, the continued increase in the demand for network access at increased channel rates while supporting quality-of-service (QoS) requirements have required a continuous evaluation of the standard and change thereto. For example, much effort has been placed on support for real-time multimedia services in WLAN's, particularly with Quality of Service (QoS) guarantees.

One technique used to attempt to coordinate the access/use of the operating channel of the WLAN is polling. Polling is a process where a QoS access point (QAP) sends a transmission to QoS Station (QSTA) with certain requirements such as the stream requirements. This is effectively a granting of permission from QAP to the QSTA to grant channel access rights for the indicated duration. The QSTA has a scheduled time for access and the minimum time between two successive scheduled service periods is known as a minimum service interval. In the interim between the scheduled service intervals the QSTA may enter a power saving mode or conduct some internal processing, or both. For example, the QSTA may use the down time for other tasks, especially to conserve power. Without the knowledge of the commencement of the minimum service interval, the QSTA would have to remain in an active mode awaiting its next command by the QAP to begin access to a channel after a service period. This would be an inefficient use of resources.

While the provision of the IEEE 802.11E specification for the polling sequence outlined above does advance the efficiency of the WLAN, there are, nonetheless, shortcomings. For example, the minimum service interval and the maximum service interval are referenced from the start of the first successful data or Contention Free (CF) QoS Poll (QoS(+) CF-Poll) transmission by the QAP (also referred to as the Hybrid Coordinator (HC)). Although a data frame or QoS (+)CF-Poll transmitted by the QAP may be received correctly by the QSTA, the required acknowledgement of the receipt may not be received properly by the QAP. As such, the QSTA sets the reference for the minimum service interval at the time prescribed in the poll and to the prescribed parameters set therein (the reference is from the start of a QoS(+)CF-Poll or a downlink transmission), while the QAP having not received the acknowledgement, retransmits the previous signal based on the assumption that the previous transmission was not received.

However, because the QSTA has set the start of the minimum interval already, it may be, for example, at the end of the maximum service interval, in power save mode, so it will not receive the poll, and a protocol failure has occurred. That is, the synchronization of start of service periods between QAP and QSTA is broken. Also, if the beginning of the service period is not synchronized from the perspective of the QSTA, after a maximum service duration from the beginning of the service period, the QSTA may enter power-save mode. However, because the start of the service period is not synchronized, with the QAP marking the start of the service period later than the QSTA, the maximum service duration ends later. Therefore, the QAP could continue transmitting data to QSTA while the QSTA is in power-save mode, resulting in a protocol failure. Therefore, there is need in the art to require QSTA to remain awake until it is explicitly told about the end of the service period.

In addition to the ambiguity that can arise in the set-point of the start of minimum service interval, the end of the service period can also be ambiguous and result in a protocol failure even if the service period start times are synchronized. For example, if more than one transmission opportunities (TXOP's) are granted by QAP in a series of QoS (+)CF-Polls in one service period, then a QSTA, without the knowledge that a particular TXOP is the last one, would have to wait until the end of the maximum service duration before going into power-save mode. Of course, this can result in an unnecessary use of power by the QSTA.

Accordingly, what is needed is a method of polling and transmitting data and/or voice frames between the QAP and the QSTA's of a WLAN that overcomes at least the deficiencies of known techniques such as those described above.

In accordance with an exemplary embodiment, a method of transmitting frames from a first device of a wireless local area network (WLAN) to a second device of the WLAN includes sending a first frame including a first transmission indicator from the first device to the second device. The first transmission indicator indicates that a service interval is to begin at a certain time. The method also includes sending an acknowledgement from the second device to the first device indicating receipt of the first transmission indicator; and sending a second frame including another first transmission indicator if, after a prescribed time period, the acknowledgement is not received by the first device.

In accordance with another exemplary embodiment, a wireless local area network includes a first device and a second device. The first device sends a first frame including a first transmission indicator, which indicates that a service interval is to begin at a certain time. The second device sends an acknowledgement from the second device to the first device indicating receipt of the first transmission indicator. The first device sends a second frame including another first transmission indicator if, after a prescribed time period, the acknowledgement is not received by the first device.

The invention is best understood from the following detailed description when read with the accompanying drawing figures. It is emphasized that the various features are not necessarily drawn to scale. In fact, the dimensions may be arbitrarily increased or decreased for clarity of discussion.

Figure 3A:
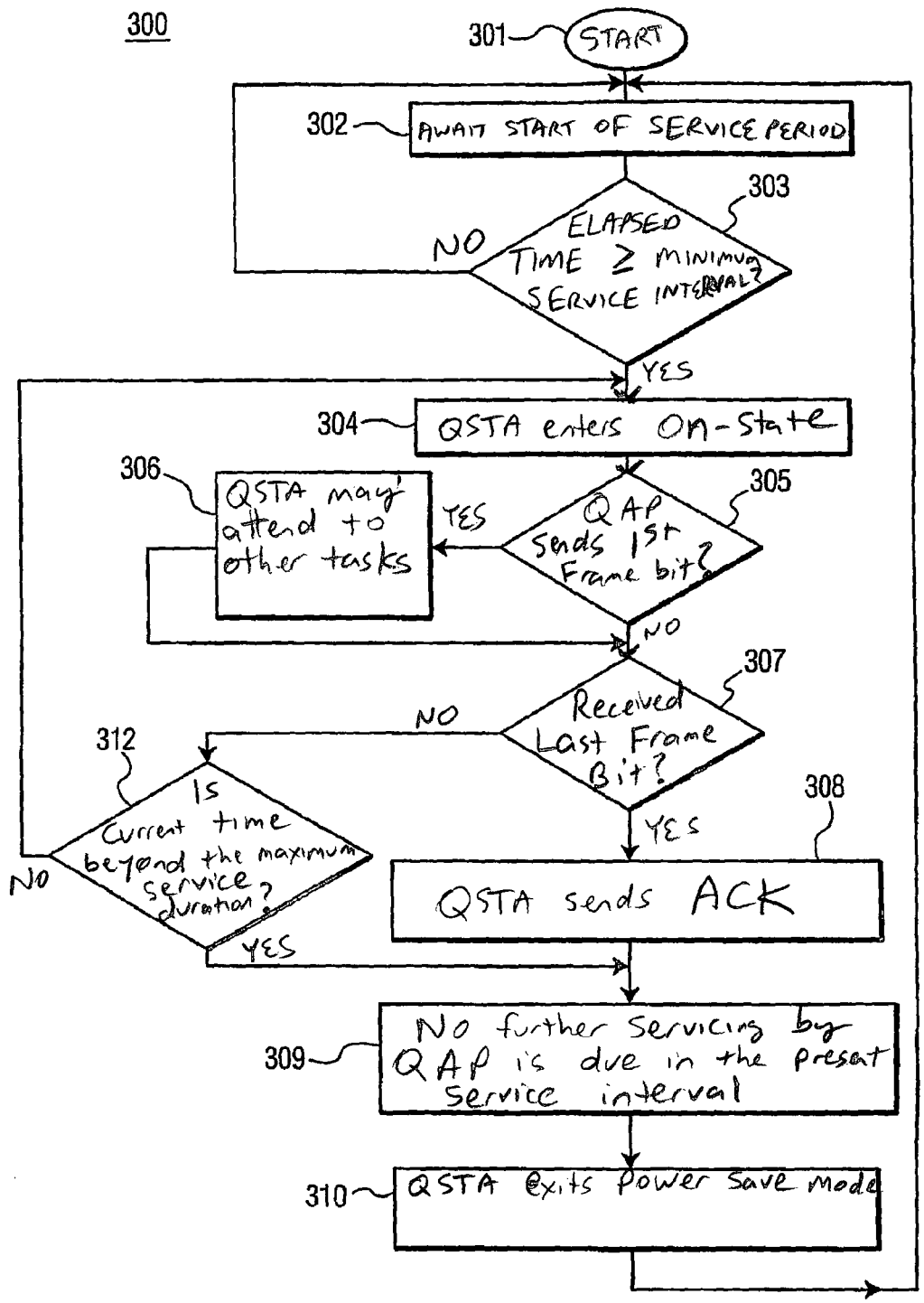
FIG. 3a is a method of transmitting frames between QAP and a QSTA in accordance with an exemplary embodiment.
Figure 3B:
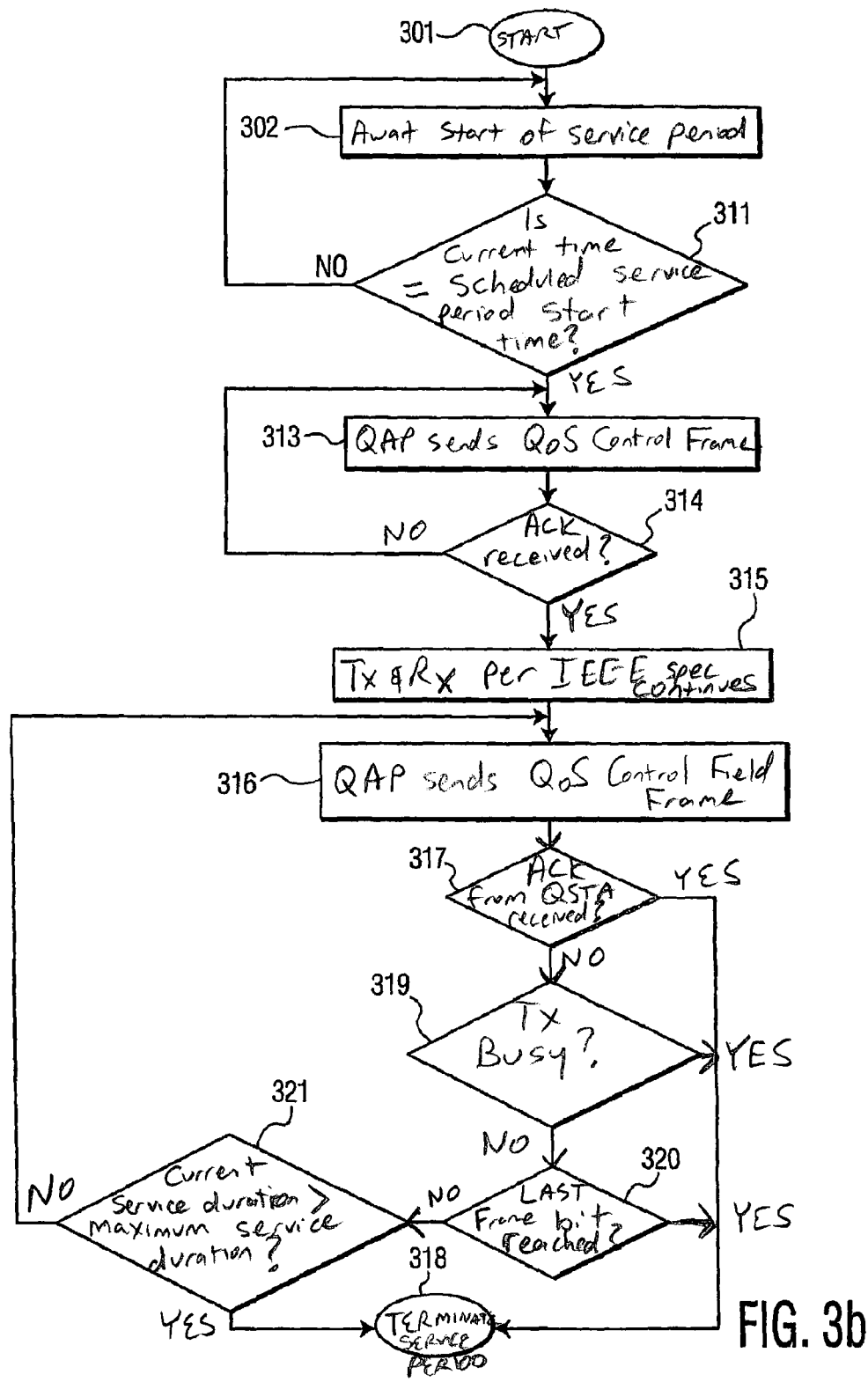

FIG. 3*b* is a method of transmitting frames between a QSTA and a QAP in accordance with an exemplary embodiment.

In the following detailed description, for purposes of explanation and not limitation, exemplary embodiments disclosing specific details are set forth in order to provide a thorough understanding of the present invention. However, it will be apparent to one having ordinary skill in the art having had the benefit of the present disclosure, that the present invention may be practiced in other embodiments that depart from the specific details disclosed herein. Moreover, descriptions of well-known devices, methods and materials may be omitted so as to not obscure the description of the present invention.

Figure 1:
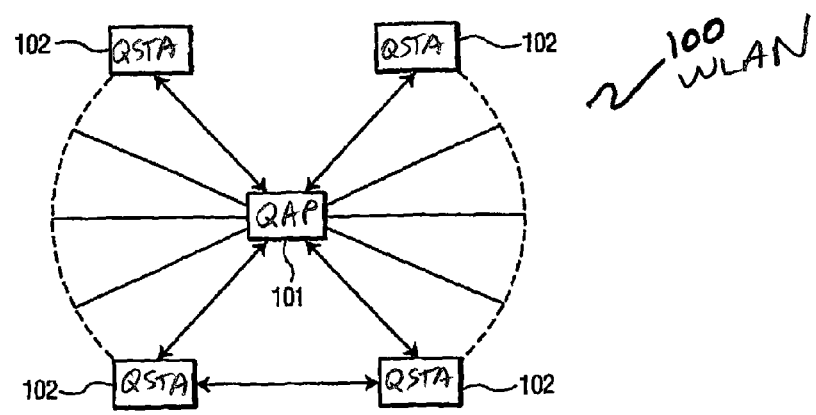
FIG. 1 is a block diagram of a wireless local area network in accordance with an exemplary embodiment.

FIG. 1 shows a WLAN 100 in accordance with an exemplary embodiment. The WLAN 100 includes at least one QAP 101, which is connected by wireless infrastructure (nor shown) to a plurality of QSTA's 102. It is noted that in the exemplary embodiment four QSTA's 102 are shown. This is done to promote clarity in the discussion of the exemplary embodiments. The QSTA's 102 are illustratively portable devices such as personal computers, consumer appliances, handsets, and other devices usefully connected in a WLAN. In accordance with an exemplary embodiment, the WLAN 100 and its elements substantially comply with the IEEE 802.11 standard, and its revisions and versions. The WLAN 100 also includes the modifications and improvements of the exemplary embodiments of the present application.

In operation the QAP 101 dictates the communications between the various QSTA's 102. To this end, the QAP coordinates the transmission of voice and data by the QSTA's 102. In accordance with an exemplary embodiment the QSTA's 102 are connected to one another only through the QAP 101. In accordance with another exemplary embodiment, the QSTA's may be in communication with one or more QSTA's without having to transmit first to the QAP 101. The former is known as an uplink, while the latter is referred to as a direct link. While these aspects of the WLAN 100 are germane to a general understanding of the exemplary embodiments, their details are not generally required for an understanding of the exemplary embodiments. As such, these details are not included so as to not obscure the description of the exemplary embodiments.

Figure 2:
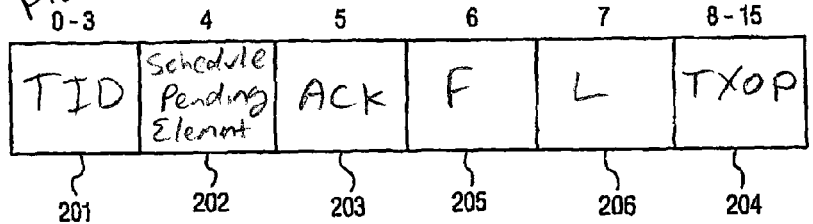
FIG. 2 is an illustrative QoS Control Field frame in accordance with an exemplary embodiment.

FIGS. 2 and 3 show an illustrative QoS Control frame, and an exemplary method of transmitting frames between a QAP and a QSTA in accordance with exemplary embodiments, respectively. The QoS Control Field Frame 200 frame is formatted per the specification IEEE 802.11E Draft D4.0 Article 7.1.3.5 with modifications germane to the exemplary embodiments. It is noted that the entire disclosure of the referenced specification is specifically incorporated herein by reference.

The QoS Control Field Frame 200 includes various elements such as the traffic identifier (TID) 201, a schedule pending element 202, an acknowledgement (ACK) policy 203, and a transmission opportunity (TXOP) limit 204. The numeric notation at the top of each frame element indicates the number of bits for the frame 200. It is noted that the minimum and maximum service intervals referenced herein are normally in a separate element referenced in 7.3.2.19 Schedule Element, Figure 42.14 of the referenced IEEE specification.

A noteworthy addition to the QoS Control Field Frame 200 according to an exemplary embodiment is the inclusion in one of the frames reserved under IEEE 802.11E Article 7.3.5 of the first frame bit (F) 205 and a last frame bit (L) 206. It is noted that the terminology may vary for the first frame bit 205 and the frame bit 206. For example, these may be referred to as a first transmission indicator and a last transmission indicator. Regardless of the terminology used, the first frame bit 205 is a frame element of the QoS Control Field Frame 200 that is sent by a QAP to a QSTA to indicate that a service interval is to begin; and a last frame bit 206 is a frame element that is sent by an QAP to a QSTA to indicate that a service period is to end. Characteristically, the first frame bit 205 synchronizes the QAP and the QSTA as to the start of a service interval; and the last frame bit 206 synchronizes the QAP and the QSTA as to the end of a service period.

Initially, the function of the first frame bit 205 is discussed in detail, followed by a discussion of the function of the last frame bit 206. In accordance with the exemplary method 300 of FIG. 3*a*, at step 301, the start of the transmission sequence is shown from the perspective of the QSTA. The QSTA awaits for the start of a service period at step 302. In this mode, the QSTA can manage internal queues, or enter a power save mode. Of course, this allows the QSTA to perform functions that may expire, and/or save power, since it will not communicate with the QAP at this time. If the time elapsed is equal to or greater than that of a minimum service interval at the query step 303, the QSTA enters an on-state at step 304 and receives or transmits to the QAP if polled. If the period of time is less than a minimum service interval at step 303, the QSTA repeats steps 302 and 303 as shown.

If, at step 305, the QAP sends a first frame bit, the QSTA sets the first service period start reference point. This indicates the time that a service period will begin. During this service period, the QAP can service the QSTA. To this end, from the receipt of the first frame bit, the particular QSTA records the duration of time from the receipt of the QoS Control Field 200 to the commencement of the service interval. After the reference point has been properly set at step 306, the QSTA may attend to other internal tasks, or enter power save mode as desired. Upon commencement of the service interval, the transmission and reception of data and/or voice may occur. During the service period there are a prescribed number of uplink (from QSTA to QAP), downlink (from QAP to QSTA) and direct link transmissions/polls. This procedure is effected in keeping with the protocol of the referenced IEEE 802.11 standard and/or its revisions. To indicate the end of the service interval, the last QoS Control Field Frame of the interval is transmitted by the QAP, and includes a last frame bit L 206.

At step 307, the QSTA queries whether the last frame bit 206 has been received. If the last frame bit has been received, the QSTA send an ACK at step 308. At this point, the QSTA sets the service period end reference point. If, on the other hand, the last frame bit 206 has not been received at step 308, the QSTA queries if the current time is beyond the maximum service duration at step 312. If not, the method repeats beginning at step 304. If the maximum service duration has passed, the QSTA recognizes that no further servicing by the QAP is due in the present service interval, and the QSTA may enter a power save mode, or manage internal queues in preparation of the next service period. This is effected at step 309. Beneficially, this allows the QSTA to have a definite stopping point. This is in contrast to the known techniques, where the QSTA may remain in an 'on' state, wasting energy, or may allow certain queues that must be serviced in a particular time period to expire because the QSTA is awaiting further transmissions in vain, or both. Finally, at step 310, the QSTA exits power save mode before the next scheduled service interval begins. The process repeats as at step 301.

Before proceeding with a discussion of the transmission of the last SEF (change) of a service interval, it is useful to note that all possible scenarios of the transmission and reception of the SEF 200 have not been described in the interest of clarity. Clearly, other scenarios of transmission/reception and acknowledgement may occur, requiring reiteration (possibly in a continuous manner) of one or more of the steps of the method 300 before the required synchronicity between the QAP and the QSTA has been realized. As such, it is within the purview of the exemplary method that any required steps be repeated until the synchronized setting of the commencement of a service interval by both the QSTA and the QAP is achieved.

FIG. 3b shows a method of transmitting a method of transmitting frames between the QAP and the QSTA from the perspective of the QAP. Steps 301 and 302 are the same as above. At step 311 if the current time is equal to the scheduled service period start time, the QAP sends the QoS Control Frame, including the first frame bit set 205 at step 313. Otherwise, the sequence at step 302 is repeated. At step 314, the QAP queries if the ACK has been received by the QAP within a prescribed time. If so, the transmission and reception per the referenced IEEE specification continues at step 315. If the ACK has not been received, step 312 is repeated, and the first frame bit set 205 is re-sent. Regardless whether the QSTA received the first frame bit set 205 in a previous step, the QSTA sets the service period start reference per the recently received first frame bit set. In other words, in order to achieve synchronicity as to the start of the service period by the QSTA and the QAP, the ACK receipt is required. Therefore, the QAP will resend first frame bit set, and the QSTA will set the service period reference point per the QoS Control Field Frame received. Of course, this sub-loop comprised of steps 313 and 314 of the exemplary method may be repeated until the ACK is received by the QAP.

As is readily appreciated, the process of steps 313 and 314 results in the setting of the service period start reference uniformly at both QAP and QSTA. To wit, if the ACK has been received, both the QAP and the QSTA recognize a particular time (dictated by the QAP in the QoS Control Field Frame 200) as being the start of the service interval. This recognition provides synchronicity between the QAP and QSTA, and results directly from the transmission, reception, acknowledgement and reception of the acknowledgement of the first frame F. Stated differently, because the QAP sends a first frame element bit set 205 indicating that it is the first transmission in an interval, and the QSTA receives the first frame element bit set 205 indicating that it is the first transmission, and the QAP receives the acknowledgement that the first frame bit element 205 has been received, there can be no question that the particular is the first transmission, from which the initiation (also referred to as the reference point) of the service interval is based. But for this transmission, reception and acknowledgement of the first frame element bit set 206, failure of either the QSTA or the QAP to receive a transmission can result in the lack of required synchronicity between the QAP and QSTA. This can result in an unacceptable protocol failure such as discussed by example above.

To indicate the end of the prescribed service period, at step 316 the QAP sends a QoS Control Field Frame 200 including a last frame element bit set 206. At step 317, the QAP queries whether an ACK from the QSTA has been received or not. If so, the service period ends at step 318. If not, at step 319 a query is made if the medium of transmission between the QSTA and the QAP is busy within the PIFS. If the medium is busy, the service period terminates at step 318. If the medium is not busy, the QAP queries at step 320 if a set limit of transmissions of QoS Control Field Frames 200 including a last frame element bit set 206 have been reached. If not, a query is made at step 321 if the current service duration exceeds the maximum service duration. If so, the service period ends at step 318. If not, the sequence beginning with step 316 is repeated.

The sequence of the exemplary process beginning at step 315 substantially eliminates ambiguity in the actual termination of the service interval. To wit, the sequence of sending a last bit frame 206 by the QAP indicating that the service period is to end; the receiving of the last bit frame 206 by the QSTA; the sending by the QSTA of the acknowledgement that the last bit frame has been received; and the receiving of the acknowledgement by the QAP substantially synchronizes the end of the service period as to the QAP and the QSTA. This synchronicity provides uplink and downlink benefits. The uplink benefits include the ability to early management of certain time-sensitive queues, which can be done by the QSTA because the end of the service interval is recognized, and the QSTA does not waste valuable time awaiting further transmissions. Furthermore, this allows more time to do queue management as the end of service period is recognized early. Moreover, there are downlink benefits realized because the QSTA recognizes unequivocally that the service interval has ended, and may conserve power, or manage queues, or any other desired MAC function.

The exemplary embodiment being thus described, it would be obvious that the same may be varied in many ways by one of ordinary skill in the art having had the benefit of the present disclosure. Such variations are not regarded as a departure from the spirit and scope of the invention, and such modifications as would be obvious to one skilled in the art are intended to be included within the scope of the following claims and their legal equivalents.

The invention claimed is:

1. A method of transmitting frames from a first device of a wireless local area network (WLAN) to a second device of the WLAN, the method comprising:
   sending, by the first device, a first frame to the second device, the first frame including a first transmission indicator using a frame bit set in a Quality of Service (QoS) control field frame indicating that a service period is to begin at a first certain time;
   sending, by the first device, a second frame to the second device, the second frame including another first transmission indicator using a frame bit set in the QoS control field frame indicating that the service period is to begin at a second certain time when, after a prescribed time period, an acknowledgement of receipt of the first frame is not received by the first device, the second certain time being later than the first certain time;
   sending, by the first device, a last frame to the second device, the last frame including a last transmission indicator using another frame bit in the QoS control field;
   terminating, by the first device, the service period, when an acknowledgment of receipt of the last frame is received; and
   when an acknowledgement of receipt of the last frame is not received after a prescribed time period, terminating, by the first device, the service period, when a maximum service duration time has expired.

2. The method as recited in claim 1, wherein the method further comprises repeating, by the first device, the sending of the second frame until an acknowledgement of receipt of the second frame is received.

3. The method as recited in claim 1, wherein the method further comprises setting, by the first device, the service period to begin at the first certain time when an acknowledgment is received for the first frame, and setting, by the first device, the service period to begin at the second certain time when an acknowledgment is received in response to the second frame.

4. The method as recited in claim 1, wherein the method further comprises, after the sending of the first transmission indicator and before the sending of the last transmission indicator, sending a plurality of transmissions between the first device and the second device.

5. The method as recited in claim 1, wherein the first device is a Quality of Service (QoS) access point (QAP), and the second device is a Quality of Service Station (QSTA).

6. The method as recited in claim 5, further comprising:
sending, by the QAP, the first transmission indicator when a current time is equal to a scheduled service period start time;
setting, by the QAP, a service period start time to begin at the first certain time when an acknowledgment is received for the first frame including the first transmission indicator; and
when, after a prescribed time period, the acknowledgement of receipt of the first frame is not received by the QAP, sending, by the QAP, the second frame including another first transmission indicator and setting, by the QAP, the service period start time to begin at the second certain time, when an acknowledgment is received in response to the second frame.

7. The method as recited in claim 6, further comprising sending, by the QSTA, an acknowledgement of receipt (ACK) to the QAP, after receiving the first transmission indicator.

8. The method as recited in claim 6, further comprising retransmitting, by the QAP, another first transmission indicator, when the QAP does not receive an acknowledgement of receipt (ACK) by the QSTA after waiting a prescribed time.

9. The method as recited in claim 8, further comprising repeating, by the QAP, the waiting and retransmitting until an acknowledgement from the QSTA is received.

10. The method as recited in claim 5, further comprising waiting, by the QAP, for an acknowledgement of receipt (ACK) of the last transmission indicator from the QSTA, after the QAP sends the last transmission indicator.

11. The method as recited in claim 10, further comprising retransmitting, by the QAP, the last transmission indicator, when the QAP does not receive the acknowledgement of receipt (ACK) of the last transmission indicator from the QSTA within a prescribed time.

12. The method as recited in claim 11, further comprising repeating, by the QAP, the waiting and retransmitting until one of the following occurs:
receiving of the ACK of the last transmission indicator occurs,
a maximum number of retries is exceeded, or
a current service period is greater than a maximum service period.

13. The method as recited in claim 10, further comprising conducting, by the QSTA, internal queue management and/ or entering, by the QSTA, a power save mode, after the QSTA completes sending the ACK of the last transmission indicator.

14. The method as recited in claim 1, wherein the second device enters an on-state when an elapsed waiting time for a start of the service period is equal to or greater than a minimum service period.

15. A first device in a wireless local area network (WLAN), the first device comprising:
a transmitter;
a receiver; and
a controller configured to:
send a first frame to a second device, the first frame including a first transmission indicator, wherein the first transmission indicator is a frame bit set in a Quality of Service (QoS) control field frame indicating that a service period is to begin at a first certain time;
send a second frame including another first transmission indicator, wherein the another first transmission indicator is a frame bit set in the QoS control field frame indicating that the service period is to begin at a second certain time that is later than the first certain time when, after a prescribed time period, an acknowledgement of the first frame is not received by the first device
send, by the first device, a last frame to the second device, the last frame including a last transmission indicator using another frame bit in the QoS control field;
terminate, by the first device, the service period, when an acknowledgment of receipt of the last frame is received; and
when an acknowledgement of receipt of the last frame is not received after a prescribed time period, terminate, by the first device, the service period, when a maximum service duration time has expired.

16. The WLAN as recited in claim 15, wherein the first device is a Quality of Service Access Point (QAP) and the second device is a Quality of Service Station (QSTA).

17. A wireless local area network (WLAN), comprising:
a first device and a second device, wherein the first device is configured to send a first frame to the second device, the first frame including a last transmission indicator using a frame bit set in a Quality of Service (QoS) control field frame indicating that a service period is to end at a first certain time;
the second device being configured to set the service period to end at the first certain time based on the last transmission indicator and send an acknowledgement to the first device indicating receipt of the first frame; and
the first device being further configured to send a second frame including another last transmission indicator to the second device, wherein the another last transmission indicator is a frame bit set in the QoS control field frame indicating that the service period is to end at a second certain time that is later than the first certain time when, after a prescribed time period, the acknowledgement is not received by the first device, wherein when the second frame is received, the second device is configured to set the service period to end at the second certain time instead of the first certain time, and send an acknowledgement to the first device indicating receipt of the second frame, and, if the acknowledgement indicating receipt of the second frame is not received by the first device after a prescribed time, the first device is configured to end the service period, when the service period has not exceeded a maximum service period time.

18. The WLAN as recited in claim 17, wherein the first device is a Quality of Service Access Point (QAP) and the second device is a Quality of Service Station (QSTA).

* * * * *